United States Patent
Reindl et al.

[11] Patent Number: 6,144,332
[45] Date of Patent: Nov. 7, 2000

[54] PASSIVE SURFACE WAVE SENSOR WHICH CAN BE WIRELESSLY INTERROGATED

[75] Inventors: Leonhard Reindl, Prutting; Folkhard Müller, München; Clemens Ruppel, München; Wolf-Eckhart Bulst, München, all of Germany; Franz Seifert, Vienna, Austria

[73] Assignee: Siemensn Aktiengesellschaft, Munich, Germany

[21] Appl. No.: 08/270,931

[22] Filed: Jul. 5, 1994

Related U.S. Application Data

[63] Continuation of application No. PCT/DE92/01075, Dec. 21, 1992.

[30] Foreign Application Priority Data

| Jan. 3, 1992 | [DE] | Germany | 42 00 076 |
| May 22, 1992 | [DE] | Germany | 42 17 049 |

[51] Int. Cl.⁷ .................................................. G01S 13/02
[52] U.S. Cl. ...................... 342/42; 340/10.1; 340/825.72
[58] Field of Search ................. 342/42, 44, 50, 342/51; 340/825.54, 825.72, 10.1

[56] References Cited

U.S. PATENT DOCUMENTS

| 3,273,146 | 9/1966 | Hurwitz | 342/51 |
| 4,265,124 | 5/1981 | Lim et al. | |
| 4,620,191 | 10/1986 | Skeie | 342/51 |
| 4,725,841 | 2/1988 | Nysen et al. | 342/44 |
| 4,734,698 | 3/1988 | Nysen et al. | 342/44 |
| 4,951,057 | 8/1990 | Nagel | 342/51 |

FOREIGN PATENT DOCUMENTS

| 0361729 | 4/1990 | European Pat. Off. |
| 3438051 | 4/1986 | Germany. |
| 2165424 | 4/1986 | United Kingdom. |

OTHER PUBLICATIONS

"Surface acoustic–wave . . . ", Bowers et al., Review of Scientific Instrument, Jul. 1989, No. 7, pp. 1297–1302.
"Measurement of Saw Velocity", Cullen et al., 1975 Symposium Proceedings, IEEE, pp. 519–522.
"Surface–Acoustic–Wave Pressure and Temperature . . . ", Reeder et al., Proceedings of the IEEE, pp. 754–756.

*Primary Examiner*—Ian J. Lobo
*Attorney, Agent, or Firm*—Herbert L. Lerner; Laurence A. Greenberg; Werner H. Stemer

[57] ABSTRACT

In a passive surface wave sensor for measured value determination, a measured value is transmitted by radio from a remote measuring location to an interrogation device, which transmits energy by radio to a sensor element as an interrogation pulse. The surface wave sensor is suitable for contactless measured value acquisition. A surface wave configuration is the sensor element and a surface wave reference element is provided for phase discrimination and/or propagation time measurement. As a further development, a sensor operated with chirped transmitting signals and having chirped reflectors is provided, in which the configuration has a reference function in place of the reference element. A sensor constructed in such a way that it has a chirped function has the characteristics of an imminently temperature-compensated sensor for measuring other physical or similar variables.

43 Claims, 9 Drawing Sheets

PASSIVE SURFACE WAVE SENSOR WHICH CAN BE WIRELESSLY INTERROGATED

CROSS-REFERENCE TO RELATED APPLICATION

This application is a Continuation of International Application Ser. No. PCT/DE92/01075, filed Dec. 21, 1992.

BACKGROUND OF THE INVENTION

1. Field of the Invention

The present invention relates to a passive sensor which operates on the principle of acoustic surface wave configurations and has sensor signals which can be interrogated by radio.

In many technical applications it is important to provide availability of measured variables that are of interest by wireless means and from a certain distance, i.e. in such a way that the actual sensor element being used operates passively, which is to say it does not require any energy source or power supply of its own. For example, it is of interest to be able to monitor or measure the temperature of the wheel bearings and/or of the brake blocks on a train passing by. Another application is that of measuring the torque of a rotating shaft of a machine. A further major area of application is that of medicine and chemistry, for example being able to establish the partial pressure of oxygen in the blood of a living organism or, in particular in the area of environmental protection, being able to detect concentrations of solvents in air and/or water even from a distance, in order to then have such measured data, for example obtained in a hazard zone, available at a safe remote location and to process that data there.

Previously adopted ways of achieving that objective have been to use active sensors which are fed by battery and are interrogated telemetrically or transmit permanently, or to carry out the monitoring by optical means using a television camera.

Surface wave configurations have been known for almost two decades. Such configurations are electronic-acoustic components which include a substrate with piezoelectric characteristics, at least in subregions of the surface, and finger electrode structures located on or in the surface. Acoustic waves are generated in that surface by electrical excitation, emanating from an electroacoustic (input) interdigital converter. The acoustic waves run in that surface and again generate an electric signal from the acoustic wave in a further (output) converter. An essential feature of those components is that, by selection of the structure of the converters and, if appropriate, of further structures disposed on the surface, a signal processing of the electric signal entered into the input converter, into an output converter signal, can be carried out. Input converters and output converters may also be one and the same converter structure. A signal which is, for example, a broadband radio-frequency signal can be fed to the input and at the output there is available a signal which is, on the other hand, a time-selective pulse-compressed signal, having a timing which is a predeterminable characteristic, dependent on (measured-value) parameters, of the surface wave configuration which is concerned.

Identity tags (ID tags) (known from U.S. Pat. No. 3,273,146 and U.S. Pat. No. 4,725,841), which make it possible for the presence or identity of objects or persons to be established by radio and which operate passively, have operated on the basis of acoustic surface wave configurations for decades. In that case it is a relevant factor that in such a surface wave configuration the interrogation signal can be intermediately stored due to the powerful piezoelectric effect of the substrate and consequently no further power supply of the identity tag is necessary. An electromagnetic radio-frequency interrogation pulse that is transmitted from an interrogation device is captured by the antenna of the surface wave identity tag, i.e. of the ID tag.

Through the use of the electroacoustic interdigital converter, operated as an input, of the surface wave configuration, an acoustic surface wave is generated in the latter. Due to selected structures of the surface wave configuration, which are chosen to comply with respective specifications that can be defined entirely individually, the surface wave generated in the configuration is modulated and, at the output, a correspondingly modulated electromagnetic signal is recovered. That signal can also be received from a distance through the antenna of the configuration. The surface wave configuration consequently responds to the above-mentioned interrogation pulse after a (basic) delay which is specified in advance for the configuration with an (individual) radio-frequency identification code word, that is to be evaluated by radio in the interrogation device concerned. Such a configuration is described, for example, in U.S. Pat. No. 3,273,146 from the year 1966.

Quite independently thereof, it has been known likewise for more than a decade to use sensors operating on the basis of acoustic surface wave configurations such as, for example, a thermometer, pressure sensor, acceleration meter, chemical sensor or biological sensor, etc.. Examples thereof are described in the printed publications IEEE Ultrasonic Symp.

Proc. (1975) pp. 519–522; Proc. IEEE, vol. 64 (1976) pp. 754–756 and Published European Application No. 0 361 729 A2 (published Apr. 4, 1990). Those known configurations operate on the principle of an oscillator, which differs significantly from the mode of operation of the ID tag and, as active configurations, they also require a power supply of their own.

In German Published, Non-Prosecuted Application DE 34 38 051 A1 and U.S. Pat. No. 4,620,191 (Skeie) there is described a passive transponder which is based on a surface wave configuration and responds to an interrogation signal merely with a special response signal that is coded in the surface wave structure and is consequently predetermined and always the same. As a supplement to the above-mentioned printed publications, U.S. Pat. No. 4,734,658 specifies the way in which it is possible to eliminate the investigated temperature dependence of the surface wave configuration used in this transponder, as it is described in IEEE, Ultrason. Symp. 1987, pages 583–585. With a start bit and stop bit, a standardization of all of the propagation times or phase differences is provided. Consequently, the temperature compensation for the known transponder is additionally achieved.

The above-mentioned temperature dependence was investigated in the case of a commercially available identity tag and a linear dependence of the phase difference of the reflected signals of two reflectors of the identity tag on the temperature was established. Additionally specified there is the possibility of use as a surface wave temperature sensor which can be interrogated remotely.

In Rev. of Scient. Instr. Vol. 60 (1989), pp. 1297–1302 there is described a sensor for aerosols which is active, i.e. operated with battery feeding, that operates with surface waves, such as that already known for more than 10 years.

The sensor includes two oscillators with energy-fed amplifier circuits which are necessary for their operation.

A further, likewise active, sensor as an electric voltmeter with influencing of the surface wave rate is known from Published European Application No. 0 166 065 A1.

An inductive identification system, which is energy-fed by means of a coupling loop and operates with surface waves, as is used in automation technology, is known from German Published, Non-Prosecuted Application DE 40 25 107 A1. Through the use of evaluation of only error-free signal periods, a reduction in read/write errors is achieved.

With respect to a chirp transform processor that is known for some considerable time and used as a spectrum analyzer, IEEE, Ultrasonic Symp. 1982, pp. 177–179 describes the way in which its temperature dependence can be reduced. One measure specified there is to select an internal operating frequency of the processor in such a way that the otherwise occurring temperature-dependent measuring error of the processor is minimized.

SUMMARY OF THE INVENTION

It is accordingly an object of the invention to provide a passive surface wave sensor that can be wirelessly interrogated, which overcomes the hereinafore-mentioned disadvantages of the heretofore-known devices of this general type and which specifies a principle for sensors with passively operating sensor elements, that is to say which do not require any power supply of their own, that can be interrogated by radio or can be read off contactlessly from a remote location. It is particularly a matter of having an expedient reference for a comparison and/or independence from undesired influences, such as having temperature independence when detecting and measuring other variables than that of temperature.

With the foregoing and other objects in view there is provided, in accordance with the invention, in a system including an interrogation device having a transmitting part supplying interrogation signals, a receiving part and an evaluation part, a passive apparatus to be interrogated by radio and used as a measuring sensor, comprising a first surface wave structure acting as a sensor element supplying output signals; a second surface wave structure acting as a reference element supplying output signals; the interrogation device interrogating a measured value being formed from a comparison of the output signals of the sensor element and the output signals of the reference element resulting from the interrogation signals; and the sensor element and the reference element having different sensitivities to a variable to be measured.

One principle for realizing a passive surface wave sensor according to the invention is to provide at least two surface wave configurations for this sensor (as a rule), one such configuration of which operates as a reference element and the other configuration, or a plurality of other configurations, has the function of the respective sensor element. These sensor elements supply their (respective) interdigital converter which operates as an output, with an output signal which is changed in a way corresponding to the measured value to be measured, that is identifiably with respect to the input signal of this sensor element. It is possible to measure those measured variables which influence the speed or the propagation time of the acoustic wave in the surface wave configuration. This input signal is a radio-frequency signal which is transmitted by radio from the remotely disposed interrogation device and is fed to the input converter of the sensor element, operating as an input. However, this radio-frequency signal is also fed to the input of the associated reference element, in which a signal processing corresponding to the sensor element takes place and from which an output signal is likewise emitted. However, this output signal is not influenced (significantly) or is only influenced in a known way by physical or chemical effects or action of the measured variable to be established by the sensor element and is consequently a usable reference value.

From the comparison of the output signal of this reference element with the output signal of the associated sensor element, or with the respective output signal of the plurality of associated sensor elements, of the passive surface wave sensor according to the invention, a measured value signal is also obtained, for example, at the measuring location. This signal processing is preferably a phase and/or propagation time comparison or frequency comparison. This mode of operation is possible without a relevant external energy supply in the passive surface wave sensor according to the invention, to be more precise the sensor element of the latter. As in the case of an identity tag described above, in the case of the invention the transmitting energy necessary for the transmission of the measured value is namely available from the energy of the interrogation pulse.

However, the phase and/or propagation time comparison does not have to take place at the location of the sensor element or the measuring location. Consequently, in an advantageous way, the sensor element and the reference element may also be disposed spatially separately from each other and be functionally connected to each other only by radio. The reason for this is that, in comparison with the propagation rate of the acoustic wave in a surface wave configuration, the electromagnetic propagation rate is about $10^5$ times greater. The phase error or propagation time error is thus generally negligible in the case of such a separate configuration. Moreover, with a known distance between the sensor element and the reference element, the corresponding derivative action can also be provided.

This spatially separate configuration lastly described is of particular advantage, for example, in the case where a multiplicity of measuring points at a common location are to be interrogated. An example explaining this is, for example, the measuring of the temperature of brake blocks and/or wheel bearings of a railroad train passing by a predetermined location. Each brake block or wheel bearing is functionally and spatially assigned a surface wave sensor element. The reference element is located in the interrogation and evaluation device at a predetermined location along the section of line on which the train passes by.

As a rule, the interrogation unit on one hand and the receiving and evaluating unit on the other hand are disposed spatially combined with each other.

Instead of the reference element provided "explicitly" as described above, a principle of the solution which is likewise used for achieving the object of the invention is to have the reference function "implicitly" and be integrated into the principle of the solution. This case will be first of all presented in just a few words, whereas a detailed description follows further below. This variant of the general principle of the solution according to the invention again is that at least two elements which are constructed as surface wave structures with sensitive characteristics are provided, but these are made to act "against each other" in such a way that an integral mode of functioning of the two structures includes both the sensor function (by way of comparison the function of the classic sensor element) and the reference function (the classic reference element of the system described above).

A further development of the invention which goes even further is that of using a combination of the sensor element and the reference element, as are explained with respect to the system described at the outset, for the monitoring or measuring of a predetermined physical variable, such as, for example, a mechanical variable, but to select these elements and operate them in such a way that, by using an integral mode of functioning, similar to the principle of the solution explained above, an undesirably occurring further physical variable which influences the rate of the acoustic wave(s) in the surface wave structures, such as, for example, the influence of temperature, can be eliminated by compensation. The detailed description given further below also includes further information in this respect for a person skilled in the art.

The passive signal evaluations provided in the case of the invention are, for example, a phase discrimination, a signal mixing, a frequency measurement and the like. The surface wave configurations that are used are basic elements of a reference element and at least of a sensor element or the elements of a combination with an integrally, implicitly included reference function. These are constituted by filters operating with surface waves. These surface wave filters may be resonators, delay lines including those of a dispersive type, phase shift keying (PSK) delay lines and/or convolvers. In particular, these surface wave configurations are constructed in an advantageous way as low-loss filters. In the case of the principle of the solution with an integral implicit reference function as well as the further development with, for example, temperature compensation, chirped reflector and/or converter structures are suitable.

These surface wave configurations operate by utilizing the piezoelectric effect of the substrate material or of a piezoelectric layer located on the substrate. However, apart from quartz, which is particularly temperature-independently stable in its frequency, materials that are especially suitable as a piezoelectric material are also materials with high piezoelectric coupling, such as lithium niobate, lithium tantalate, lithium tetraborate and the like (as a single crystal), zinc oxide, in particular for layers, and piezoelectric ceramic, although they in turn have considerable temperature dependence.

It has already been mentioned above that the reference element and the one sensor element or the plurality of sensor elements may be disposed spatially combined with one another. An advantage of such a configuration is that the phase and/or propagation time evaluation and the like can be performed virtually free from external disturbances, or external disturbances can be suppressed to a minimum, for example by suitable shieldings. Of course, in this case care has to be taken to ensure that the reference element is, at least to the greatest extent, free from the physical influence that is exerted by the variable to be measured, which is, for example, temperature. For this purpose, the reference element and the one sensor element or the plurality of sensor elements may, for example, be disposed on mutually separate substrates and only the respective sensor element is exposed to the influence of the measured variable. In order to take temperature measurements it may also be provided, for example, for the reference element to use quartz as the substrate, whereas lithium niobate or some other substrate material which has relatively great temperature dependence is provided for the sensor element or elements. For many cases, temperature changes of the quartz substrate of the reference element still enforces a negligible effect on the output signal of the latter.

In order to provide (temperature) compensation, correction specifications may also be defined. This can be achieved, for example, by the instantaneous temperature of the entire surface wave configuration being determined by means of one of the sensor elements and this temperature value being used as a specification for the correction of the measured values of those remaining sensor elements which are measuring other physical variables.

The combined configuration of the elements is expedient, and even necessary as a rule, for achieving high accuracy, as well as for the system with an integral, implicit reference function or its further development with integral temperature compensation, for example.

In order to increase the transmission capabilities between the sensor configuration according to the invention (with or without a reference element included therein), it is recommended to use band spreading methods that are known per se and to provide matched filters with pulse compression.

In the case of surface wave configurations it is known to construct them in such a way that Rayleigh waves, surface shear waves, surface leaky waves and the like are generated and evaluated.

In cases in which a plurality of surface wave sensor elements are to be interrogated by an interrogation device, for example in which a plurality of different measured variables are to be established and/or the same measured variable is to be established at different locations and/or objects, identification functions may also be advantageously integrated additionally in the individual (sensor) elements. This integration may be performed on a separate substrate chip or also on the same substrate chip in many cases in an advantageous way. This identification function corresponds to such a function as that explained in the case of the ID tags described at the outset. In the case of the invention, such an identification function may take the form in which it is additionally integrated in the surface wave structure provided for the invention or in which a corresponding additional (identification) structure is inserted between signal input and signal output of the surface wave configuration used for the invention. For example, this may be provided in an expedient way for the respective sensor element. In the case of a sensor element and a reference element in fixed assignment with each other, the reference element may also include this identification function. Another measure which can be used in the case of the invention is that of selecting the frequency of the actual measuring signal and that of the identification signal at different levels from each other. In this way, mutual disturbances which otherwise cannot be completely ruled out from the outset for an individual case and may require consideration, can be avoided. In the cases in which there are provided a plurality of surface wave sensors (sensor elements) according to the invention, which have to supply measured values that are different from one another, precaution may be taken in the radio range of a respective interrogation device provided for the invention to ensure that each of these sensors according to the invention operates at an assigned frequency of its own, responds only after a respectively particular basic propagation time (delay time with respect to the interrogation pulse) and/or is matched to an individual transmitting pulse sequence. It may also be provided to separate sensor elements and antennas spatially and to connect them only by a radio-frequency-conducting cable and/or by the electrically conductive wall of a container as well.

One and the same antenna can be used for a plurality of sensors according to the invention. It may also be provided to place the antenna in an integrated configuration on the (respective) substrate of the surface wave sensor (sensor element) concerned.

Through the use of chirped surface wave structures, in particular chirped reflector structures, further advantageous effects can be accomplished with a sensor of the principle of the invention. Firstly, the use of chirped reflector structures and/or converters instead of unchirped structures permits a greater sensitivity of a sensor according to the invention. With use of chirped interrogation signals matched thereto, compression of the response signals can also be achieved, which has, inter alia, the effect of also facilitating the evaluation. With an up-chirp interrogation signal having a chirp rate which can be determined or is to be determined for it and a matching down-chirp structure in the sensor, it is even possible to use a genuine temperature independence, i.e. that is not accomplished merely by compensation, in a selectively deliberate manner.

Other features which are considered as characteristic for the invention are set forth in the appended claims.

Although the invention is illustrated and described herein as embodied in a passive surface wave sensor which can be wirelessly interrogated, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
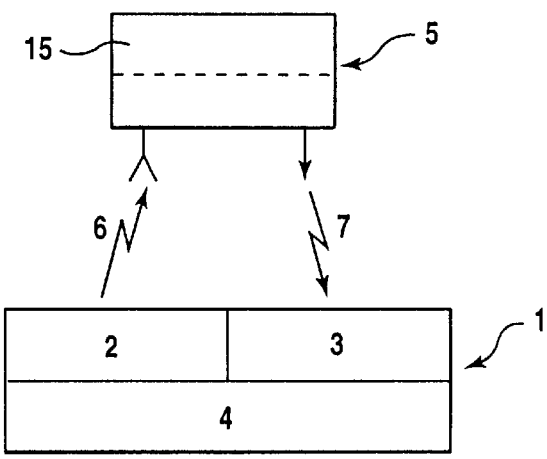
FIG. 1 is a highly diagrammatic, elevational view of a basic realization of a surface wave sensor according to the invention.

Referring now to the figures of the drawing in detail and first, particularly, to FIG. 1 thereof, there is seen an interrogation device, indicated by reference numeral 1, which is a component part of the passive surface wave sensor according to the invention. This interrogation device 1 includes as component parts a transmitting part 2, a receiving part 3 and a further component part forming an evaluation device 4. An actual passive sensor with a surface wave configuration is indicated by reference numeral 5. In operation, a radio link or channel 6 is established from the transmitting part 2 to the sensor 5 and a radio link or channel 7 is established from the sensor 5 to the receiving part 3. Energy required for the radio link 7 is contained in a signal transmitted on the radio channel 6 to the sensor 5.

The sensor is located at a measuring location and at least its sensor element 15, which is at least a component part of the sensor 5, is exposed to the physical, chemical or similar influence to be measured.

Figure 2A:
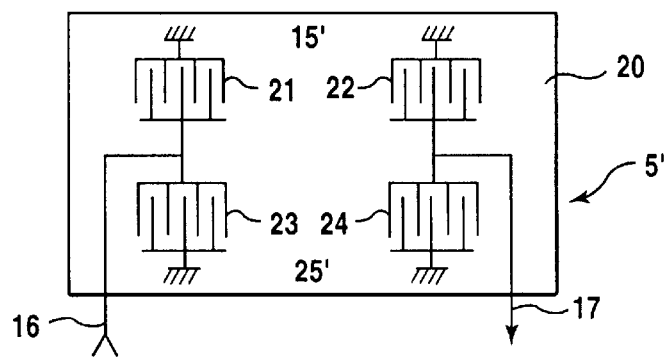
FIGS. 2a and 2b are elevational views of integrated configurations with a reference element and a sensor element; in which with a corresponding configuration of these elements and with a resulting mode of operation to be used, FIG. 2 also provides an example of the system with an implicit reference function.

FIG. 2a shows a sensor 5' with a surface wave substrate 20 having two surface wave configurations 15' and 25'. Surface wave interdigital converters 21 and 22 are respective input converters and output converters of the sensor element 15'. Corresponding interdigital converters of the reference element 25' are indicated by reference numerals 23 and 24. Antennas, which serve for receiving the radio signal of the radio channel 6 and for emitting the signal of the radio channel 7, are indicated by reference numerals 16 and 17. If appropriate, it may be adequate to merely provide a conductor path or a dipole antenna on the surface wave substrate 20 as the antenna 16 and/or 17. However, a customary antenna may also be provided. FIG. 2a shows an integrated configuration of the sensor 5' as an embodiment of the sensor 5 of FIG. 1.

Figure 2B:
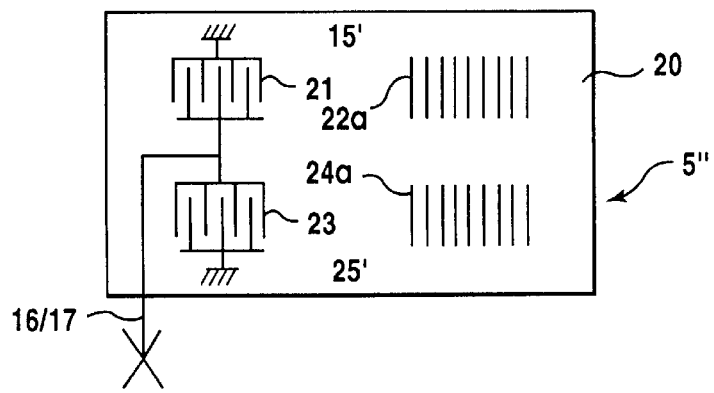

FIG. 2b shows a structure corresponding to FIG. 2a with reflectors 22a and 24a instead of the converters 22 and 24. In this case the converters 21 and 23 are the input and output of the surface wave configuration in this figure.

Figure 3A:
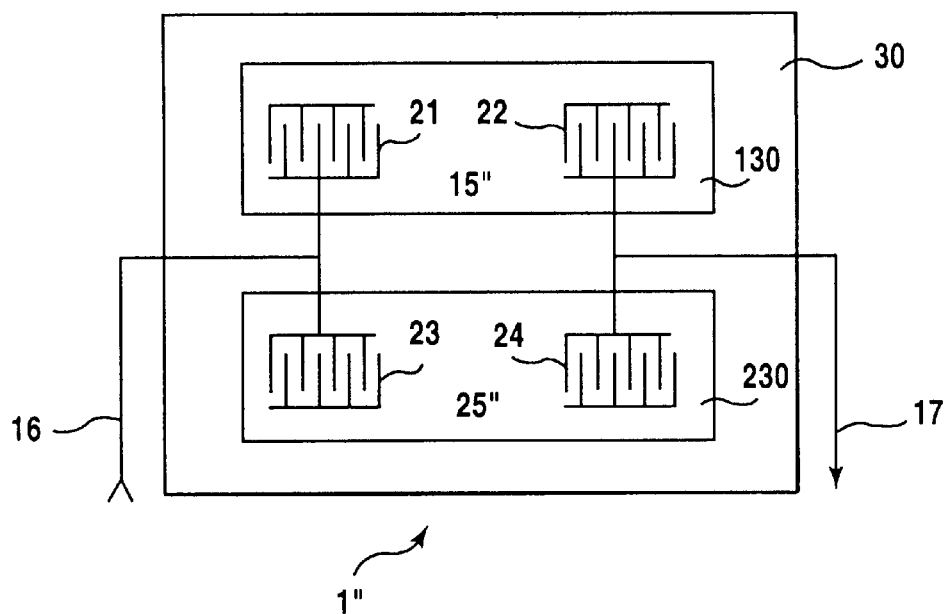
FIGS. 3a and 3b are elevational views of configurations with a reference element and sensor element disposed on different substrates.

FIG. 3a shows a configuration with a sensor element and a reference element at the measuring location. A carrier material for a piezoelectric surface wave substrate 130 of a sensor element 15" and for a piezoelectric surface wave substrate 230 of a reference element 25" is indicated by reference numeral 30. The converter structures 21–24 may be the same as those of the embodiment of FIG. 2.

For example, the substrate 130 may be a substrate of lithium niobate or lithium tantalate and the like. This material is strongly temperature-dependent with regard to its characteristics of decisive significance for surface waves. In particular, though quite contrary to the customary practice for surface wave configurations, a cutting or section of the crystal material which exhibits great temperature dependence may be chosen. In the case of a temperature sensor, quartz, which is not very temperature-dependent, is expediently to be used in this case for the substrate 230 of the reference element.

The antennas are again indicated by reference numerals 16 and 17 and the interrogation device is 1".

Figure 3B:
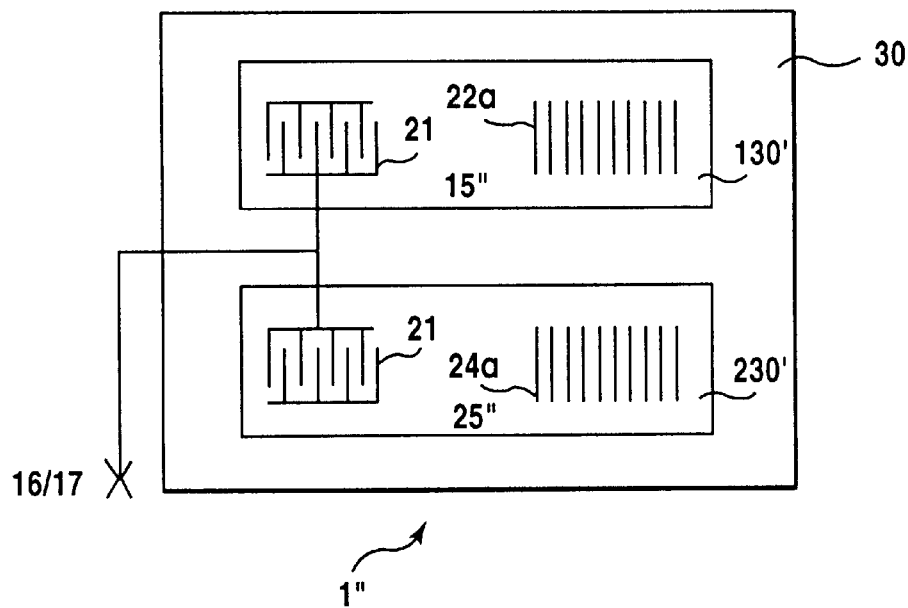

FIG. 3b shows an embodiment corresponding to FIG. 3a with reflectors 22a and 24a as in FIG. 2b instead of the converters 22 and 24.

Figure 4:
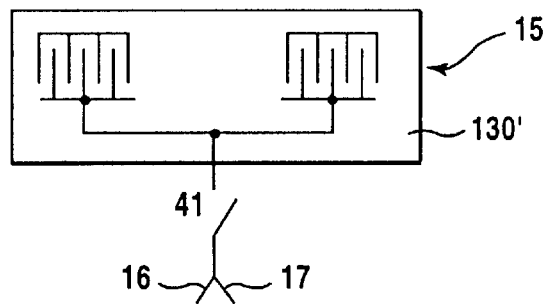
FIG. 4 is an elevational view of a configuration of the invention in which the reference element is located in an interrogation device.

FIG. 4 shows an embodiment in which the reference element 25 is contained as an additional component part in the interrogation device 1', which is described above as one possibility of realizing the invention. The passive surface wave sensor element with its substrate 130' is indicated by reference numeral 15. The relevant antennas of the sensor element are indicated by reference numerals 16 and 17 and the relevant antennas of the the interrogation device are indicated by reference numerals 116 and 117. Switches 41–43 are provided to close for the respective operating phase in order to be able to perform the phase and/or propagation time comparison between the (respective) sensor element 15 and reference element 25.

Figure 5:
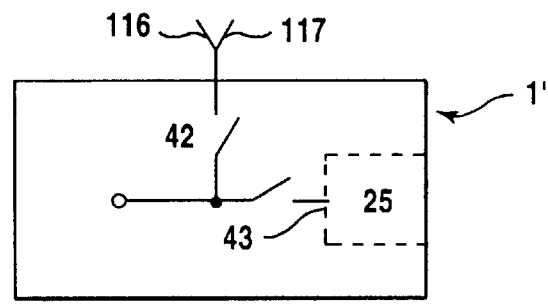
FIG. 5 is an elevational view of an embodiment with an additional identification function at different frequencies or (in particular at the same frequency) with different propagation times a sensor signal and an identification signal.
Figure 5:
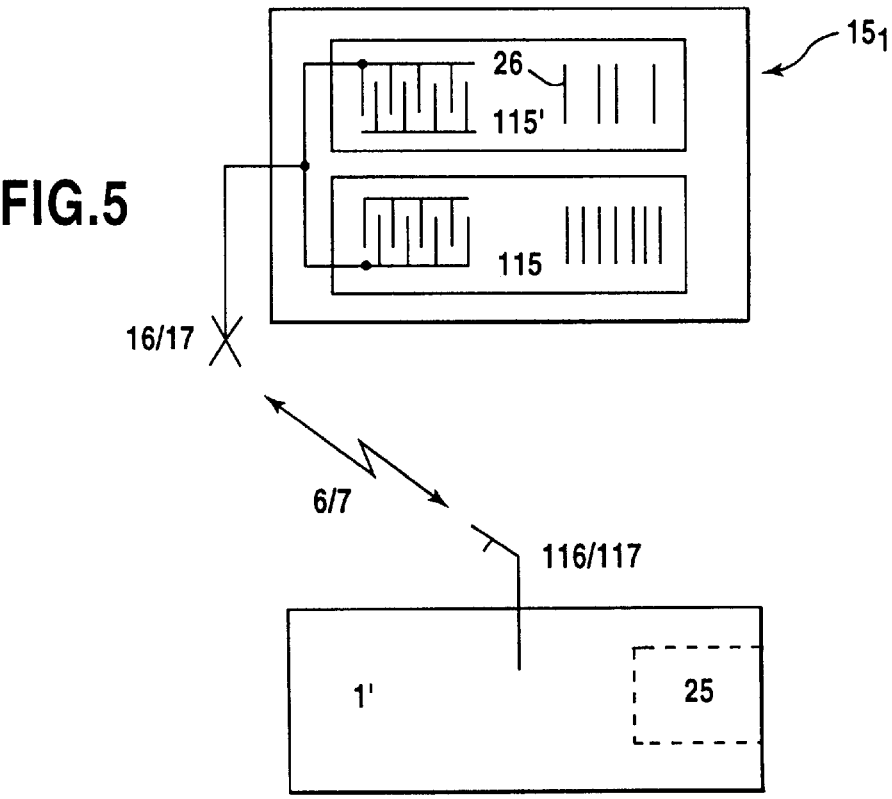

FIG. 5 shows a configuration according to the invention which corresponds in principle to the embodiment of FIG. 4 but which additionally includes means for realizing an identification function. The interrogation device with the reference element 25 contained therein is again indicated by reference numeral 1'. The radio link from the interrogation device 1' to the sensor $15_1$ is indicated by reference numeral 6. The sensor $15_1$ includes two sensor elements 115 and 115'. The sensor element 115 is constructed for a first frequency $f_1$. The sensor element 115' contains a coding structure which is indicated by reference numeral 26. The inputs and outputs of the two sensor elements 115 and 115' are connected in parallel with respect to the antenna 16. The radio link to the interrogation or evaluation device 1' is again indicated by reference numeral 7. In a manner corresponding to the coding, the acoustic path of the sensor element 115' supplies a characteristic response signal. The two sensor elements 115 and 115' may also have a different basic propagation time or have both a different frequency and a different basic propagation time.

Figure 6:
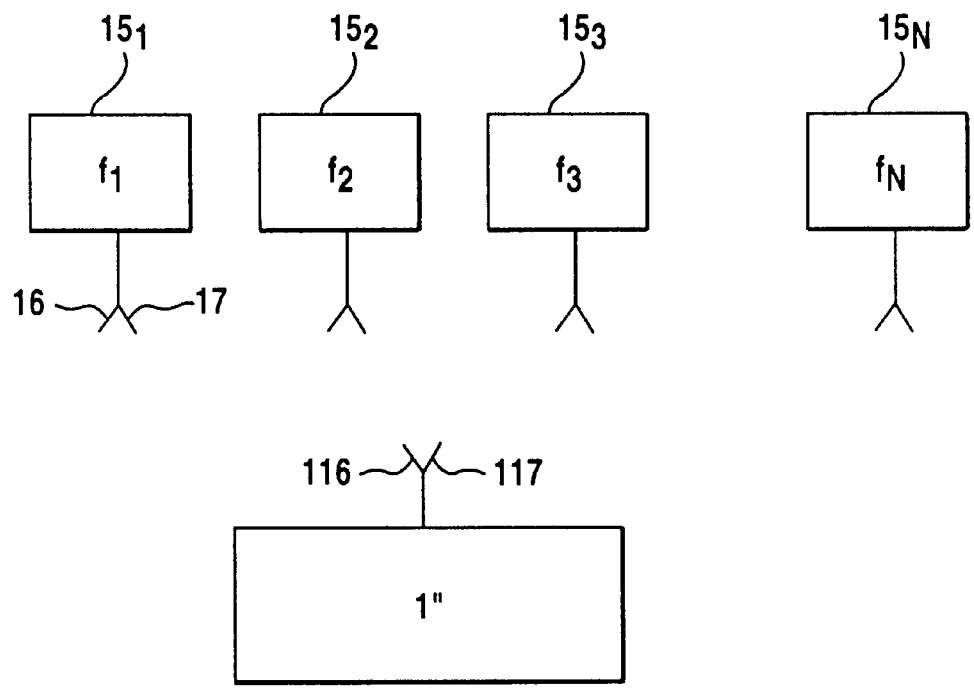
FIG. 6 is a basic elevational view of a configuration with an interrogation device and a plurality of surface wave sensors according to the invention, or a sensor array with a plurality of individual sensors, which operate at different frequencies.

As a basic structure, FIG. 6 shows a representation with a plurality of sensor elements $15_1$, $15_2$, $15_3$ to $15_N$, which all lie (simultaneously) in the radio link hop of the interrogation device. In the case of each of these sensor elements there is a characteristic predetermined frequency $f_1$, $f_2$, $f_3$ to $f_N$. The interrogation device 1, 2' contains the component switching parts which are necessary for interrogating the sensor elements $15_1 \ldots 15_N$ and for processing the measured value signals received from these sensor elements. One physical variable can be measured separately by each individual sensor element $15_1$ to $15_N$.

Figure 7:
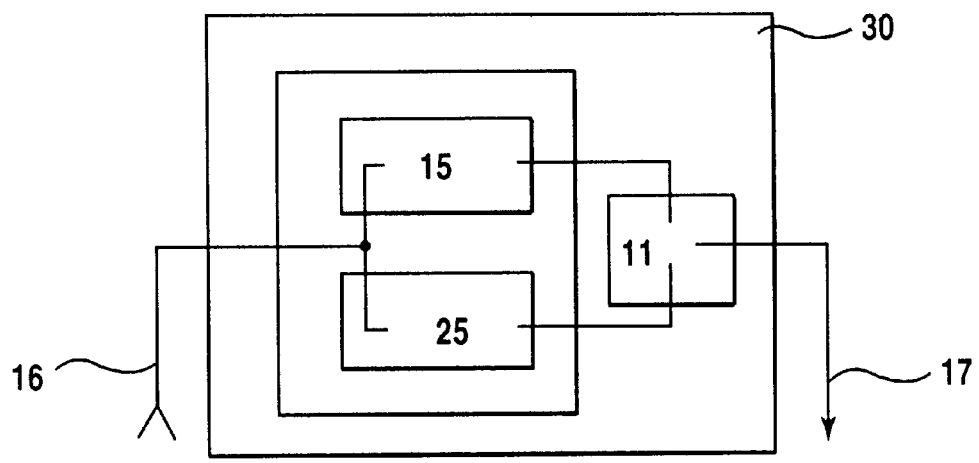
FIG. 7 is an elevational view of a further configuration with an additional device for passive signal processing, located on the sensor.

FIG. 7 shows a further configuration of the invention. It is a configuration with passive signal processing, for example evaluation with phase discrimination. Located on the chip or carrier 30 are the sensor element 15 and the reference element 25. A phase discriminator is indicated by reference numeral 11 and is (likewise) disposed on the carrier 30. The antenna transmits the discriminator signal.

Additional details of the further principle of the solution, which was already described in more detail above, with an integrated, implicit reference function of the surface wave structures or elements being used, are described below, to be precise in the example of a temperature sensor. However, this principle of the solution is not in any way restricted to temperature measurement, but instead can also be used for the measurement of forces, pressure values, light, corpuscular radiation, humidity and gas ballast. In order to measure such physical variables, there may also be additionally provided a physically, chemically and/or biologically active layer, which for its part may also be additionally effective in a signal-amplifying manner. Such a layer may be applied to provided surface wave configurations on the substrate surface.

As was already described above, the system of this further principle of the solution likewise includes surface wave sensor elements and the associated interrogation device with the transmitting part, receiving part and evaluation part. Chirped surface wave structures are contained in the sensor. It is known that, for an interrogation signal, such a structure has not only a certain propagation time t, but within the structure it also has a response location that is dependent on the frequency of the interrogation signal. Both the propagation time (as in the case of the exemplary embodiments previously described) as well as this location are dependent on external influences, i.e. they are dependent on measured variables which can be detected by the sensor for this reason and which influence the propagation time. Such a measured variable is, for example, the temperature of the sensor.

An interrogation signal, which is preferably chirped, is transmitted by the interrogation device and received by the surface wave structure. This signal is a radio-frequency signal which has a frequency varying in a predetermined bandwidth during the interrogation time interval from one frequency limit value to another frequency limit value. The term "chirp" is known incidentally from a publication by Meinke and Gundlach entitled "Taschenbuch der Hochfrequenztechnik", (Pocket Book of Radio-frequency Technology), chapters Q 61 and L 68. The surface wave elements being provided and the frequency band range of the interrogation signal are matched.

Figure 8:
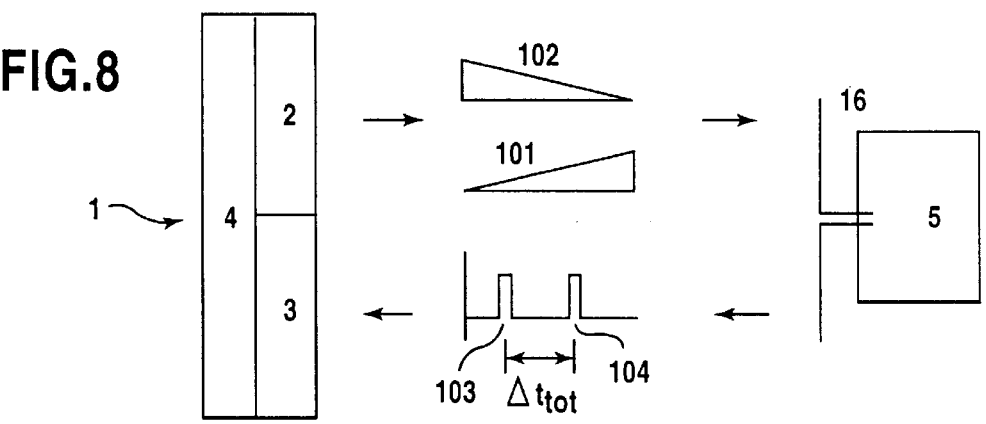
FIG. 8 is an elevational view illustrating a principle of transmitting and receiving with chirped signals as a further development of the invention.

FIG. 8 shows a basic diagram of a further development. The interrogation device with a transmitting part 2, a receiving part 3 and an evaluation part 4 is again indicated by reference numeral 1. In this case, two interrogation signals are expediently transmitted simultaneously or else one after the other. One of the signals is an up-chirp signal (increasing frequency modulation) and the other is a down-chirp signal (decreasing frequency modulation). The transmitting part thus, for example, simultaneously transmits two transmit pulses 101 and 102, of which one is the up-chirp signal and the other is the down-chirp signal. The sensor 5 receives these two chirped signals. Two response signals 103 and 104 are transmitted by the sensor 5 and passed back into the receiving part 3 of the interrogation device 1.

Figure 9A:
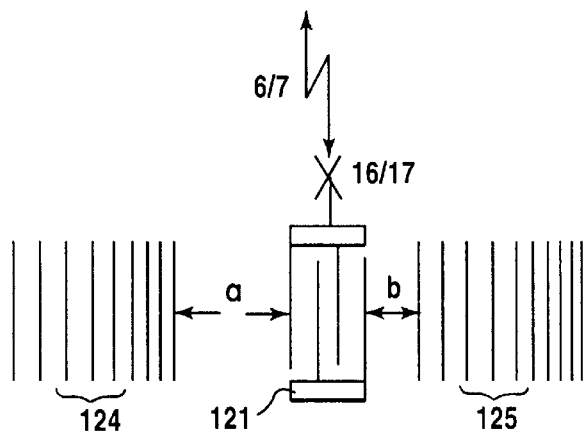
FIGS. 9a and 9b are further embodiments of the device of FIG. 8.

FIG. 9a shows as an example an embodiment of a sensor 5 associated with this principle, with a converter 121, with the antenna 16 and with two surface wave reflector configurations, which are assigned to the converter to form a complete surface wave configuration and are located on the substrate of this configuration or of the sensor 5. As can be seen from FIG. 9a, these are chirped reflectors with correspondingly changing periodicity (and changing swath width) over the reflector. Their configuration with respect to the converter 121 is chosen in such a way that in the case of the reflector structure 124 its high-frequency end (down-chirp structure) is facing the converter 121 and in the case of the reflector structure 125 its low-frequency end (up-chirp structure) is facing the converter 121. The reflector 124 acts as a compressor for the down-chirp signal and the reflector 125 acts a compressor for the up-chirp signal.

In a configuration such as that shown in FIG. 9a, the (simultaneous) transmission of the two chirped (narrowband) interrogation signals, having a respective dispersion which is matched to their associated reflector structure of the sensor, results in two time-compressed (broadband) pulses being sent back through the converter 121 and the antenna 16 as the response signal of the surface wave configuration. It is also possible to operate with interrogation pulses or a non-dispersive interrogation signal or signals and to operate further signal processing leading to the propagation time difference as the sensor result.

With a given chirped configuration of the reflector strips of the reflector structures 124, 125, the time interval between the response pulses is dependent on the propagation rate of the acoustic wave in the surface of the substrate material of the sensor. If the propagation rate changes, for example if the temperature of the substrate material changes or due to gas loading to be measured and the like, the time interval of the two pulses changes. The pulse signal which has been produced from the chirp-down signal passes (as from a certain minimum chirp rate) into the interrogation device 1 after a shorter time than an unchirped signal. In a corresponding way, a pulse signal which has been produced from the chirp-up signal arrives in the interrogation device after an even longer time than the unchirped signal.

Figure 9B:
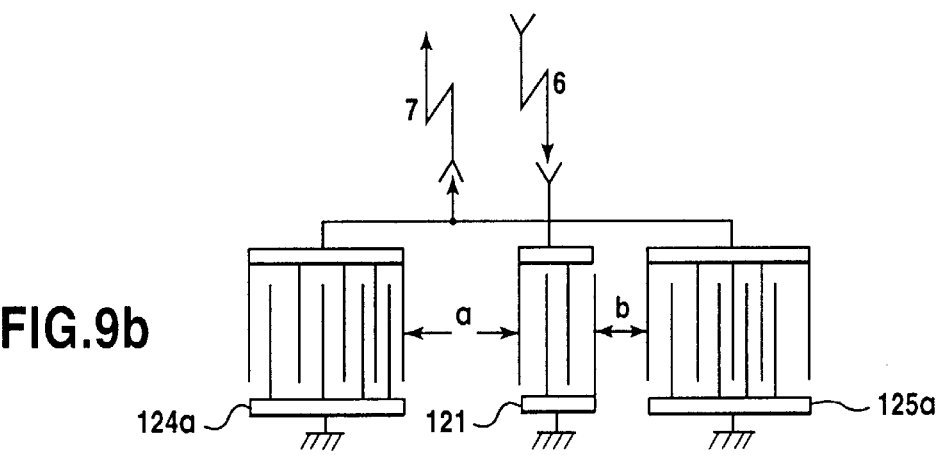

FIG. 9b shows an embodiment corresponding to FIG. 9a with chirped converters 124a and 125a instead of the chirped reflectors 124 and 125. These converters 124a and 125a are connected as an output. However, all three converters 121, 124a and 124b may also be used in a parallel connection as an input and an output.

The associated mathematical relationships are set out below.

Figure 10:
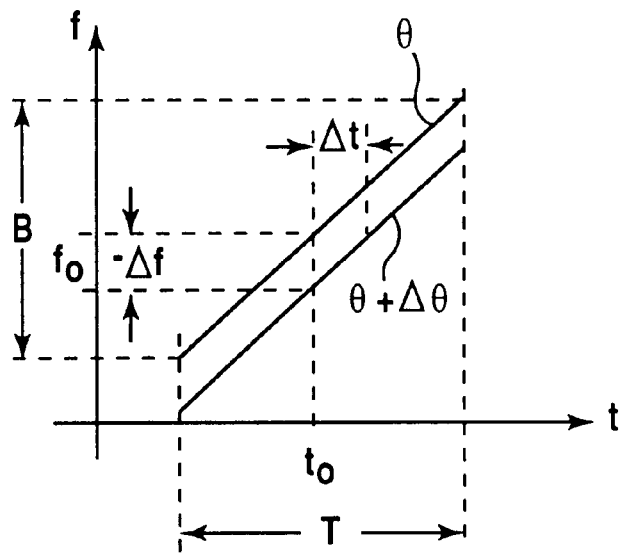
FIG. 10 is a graphic representation of the principle according to FIG. 8.

The relationship of propagation time difference $\Delta t$, chirp rate $B/_T$ (where T equals the length in time of the chirp) and temperature change $\Delta \Theta$ for a subsystem with a positive chirp rate $B/_T$ is derived with reference to FIG. 10. FIG. 10 shows instantaneous frequencies f of the pulse response of the sensor (only the up system) at a temperature $\Theta$ and a higher temperature $\Theta + \Delta \Theta$. The interrogation device 1 transmits the interrogation signal at a temperature-independent mid-frequency $f_0$, which has a propagation time that is longer at the higher temperature $\Theta + \Delta \Theta$ by the time difference $\Delta t$.

As is represented in FIG. 10 in the frequency/time plane, the chirp-independent temperature effect is ignored, namely the average propagation time $t_0$ is prolonged by the higher temperature. If this effect is also taken into consideration, the propagation time of the signal with positive frequency modulation in the sensor is calculated as $$t_{up}^{\Theta} = t_{up}^0 + \frac{T}{B} \cdot f + t_{up}^0 \Theta_K \cdot \Delta \Theta \tag{1}$$

$$f = f_0 \Theta_k \cdot \Delta \Theta$$

where $f_0$ is the mid-frequency $\Theta_k$ is the temperature coefficient of the substrate material $t^0_{up}$ is the average propagation time for $D\Theta = 0$ $\Delta \Theta$ is the temperature difference of the sensor at a certain predetermined temperature $\Theta$ Substitution and factoring out gives $$t_{up}^{\Theta} = t_{up}^0 + \left(\frac{T}{B} \cdot f_0 + t_{up}^0\right)\Theta_K \cdot \Delta \Theta \tag{2}$$

It can be seen from this formula that, with $t^0_{up} = T$, the chirp system supplies a time shift which is greater by the factor $f_0/B$, i.e. by the reciprocal relative bandwidth, than an unchirped system. In the case of the down system, the same applies analogously as in the case of the up system.

$$t_{down}^{\Theta} = t_{down}^0 + \left(-\frac{T}{B} \cdot f_0 + t_{down}^0\right)\Theta_K \cdot \Delta \Theta \tag{3}$$

and for the overall system the following results as the time shift $\Delta t_{tot}$ of the pulse signals which are produced by compression from the up-chirp and down-chirp signals:

$$\Delta t_{tot}^{\Theta} = t_{up} - t_{down} = t_{up}^0 - t_{down}^0 + \tag{4}$$

$$(2T \, f_0 / B + (t_{up}^0 - t_{down}^0))\Theta_K \cdot \Delta \Theta$$

The time shift of the overall system, on the basis of the constant basic propagation time, cancels itself out for an up system and a down system of the same basic propagation time ($t^0_{up} = t^0_{down}$) whereas the effect of the chirp is doubled. The time difference $\Delta t_{tot}$ is consequently an absolute measure of the current temperature $\Theta + D\Theta$ of the sensor or of its wave propagation rate, since the reference temperature $\Theta$ is known and fixed. The reference temperature is the temperature in the center of the measuring range of the sensor and is fixed when the latter is constructed. Through the use of a time difference $t^0_{up} = t^0_{down}$ to dimensioned in a matched manner (small), which exists, for example, at a respectively different distance between reflector and converter, the measured variable $\Delta t_{tot}$ can be set to a positive value for all temperatures in a predetermined measuring range. This (small) time difference is accomplished structurally by a correspondingly dimensioned difference in distance of the distances (a–b) between the converter 121 on one hand and the reflectors 124 and 125 in FIG. 9a or the converters 124a and 125a in FIG. 9b on the other hand. As a result, there is no need for an evaluation of the operational sign of $\Delta t_{tot}$ in the interrogation device.

Figure 10A:
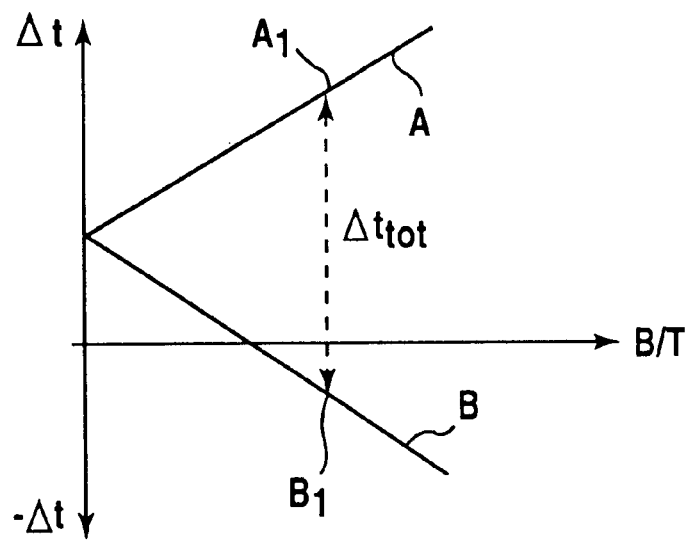
FIG. 10a is a graphic representation showing an increase in sensitivity through the use of chirped structures.

FIG. 10a is a diagram which shows the sensitivity of the sensor, i.e. the way in which a variable of the propagation time change $\Delta t$ for a value of the measured variable to be detected or to be measured changes as a function of the chirp rate $B/_T$ of the dispersive, chirped structure. The rising straight line A shows the increase in the sensitivity of an up-chirp structure with an increasing chirp rate $B/_T$. In the case of a down-chirp structure there is (initially) a reduction in the sensitivity, corresponding to the straight line B, which after passing through zero assumes negative values ($-\Delta t$), increasing values for increasing chirp rate. It is evident that the characteristic curves for an up-chirp structure and a down-chirp structure are contrary. A result for the overall sensitivity for two such structures in a sensor is the respective total propagation time difference between the two lines A and B of the two response pulses, i.e., for example, the distance between the points A1 and B1.

Figure 11:
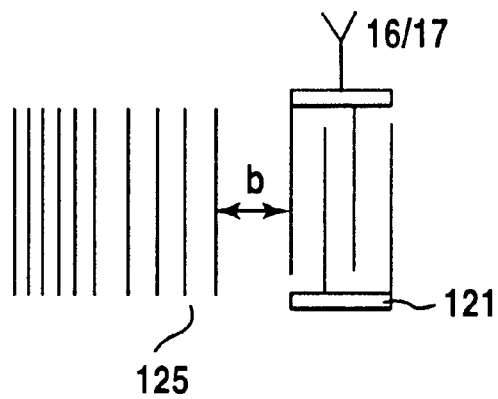
FIG. 11 is an elevational view of a further embodiment of an associated sensor.

FIG. 11 shows a variant of the embodiment of FIG. 9a of a surface wave configuration for chirped interrogation signals. There, the converters 121 and 122, which are connected in series with respect to the antenna, are provided in such a way that they are distributed over two tracks. In an analogous way, the converters may also be connected in parallel. The reflector structures 124 and 125, that are correspondingly disposed in two tracks, have the construction and characteristics of the reflector structures mentioned with respect to FIG. 9*a*. Instead of the reflector structures, converter structures may also be provided, as in FIG. 9*b*.

Figure 12:
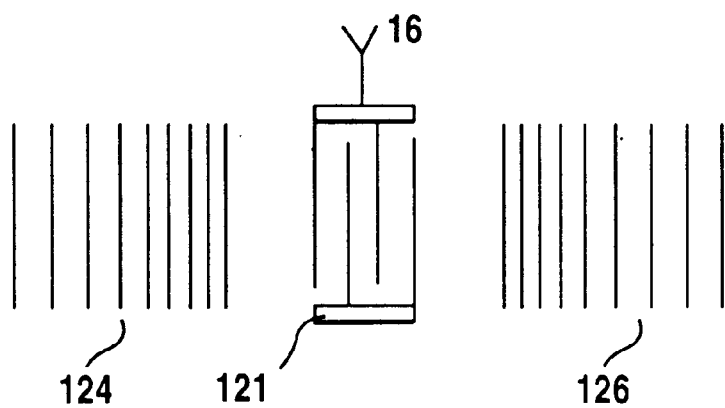
FIG. 12 is a view similar to FIG. 11 of a temperature-compensated sensor according to a first further development.

FIG. 12 shows an embodiment of a further developed sensor according to the invention, operating with surface waves. The configuration of FIG. 12 differs from that of FIG. 9*a* in that the reflector structure 126 is disposed in such a way with respect to the position of the converter 121 that in the case of the structure 126 the high-frequency end of the chirped reflector is facing the converter 121. In other words, the two reflector structures 124 and 126 are configured mirror-symmetrically with respect to the converter 121 (down-chirp structures). The teaching relating to FIG. 12 (and FIG. 13) may also be configured with up-chirp structures instead of the down-chirp structures. However, in the case of this configuration of the reflector structures according to FIG. 12, due to the mirror-symmetrical configuration of the reflectors, there is not a temperature-dependent time difference between the response pulses. In other words, the configuration according to FIG. 12 is like a sensor which is independent of the way in which the temperature of the substrate (and of the surface wave structures located thereupon) changes and/or the way in which some other effect which influences the propagation time of the acoustic wave changes. In the embodiment of FIG. 12, the surface wave configuration that is represented is temperature-compensated, to be precise by virtue of the construction. This aspect of the variant of the invention according to FIG. 12 can be used with great advantage for the temperature-independent measurement of other physical, chemical and/or biological variables. In order to measure a variable other than the temperature, for example a gas ballast, one of the two reflector structures 124, 126 is provided with a layer responding to the gas to be measured. The coated reflector structure (for example 124) responds to the measured variable, while the other reflector structure (126), which stays uncoated, remains uninfluenced by the gas. In this case only one chirped (transmitting) signal is required. In a corresponding way, only one response pulse signal is also obtained as long as the two reflectors behave identically. If, however, one of the reflectors is influenced by the measured variable, two response pulses are produced, having a time interval which corresponds to the measured variable. Instead of the reflector structures 124 and 126, converter structures may also be used.

A sensor according to FIGS. 9*b* and 11 also becomes a temperature-independent sensor according to FIG. 12 if one of the structures 124, 125 or 124*a*, 125*a* is "turned around" in such a way that these structures are both disposed with their high-frequency end (down chirp) or both with their low-frequency end (up chirp) facing the converter 121 or the two converters 121 and 122.

The structure 124 or 125 which is made sensitive to or prepared for the predetermined measured variable is effective as the sensor element. The unprepared structure 125 or 124 is the reference element for this measured variable.

Figure 13:
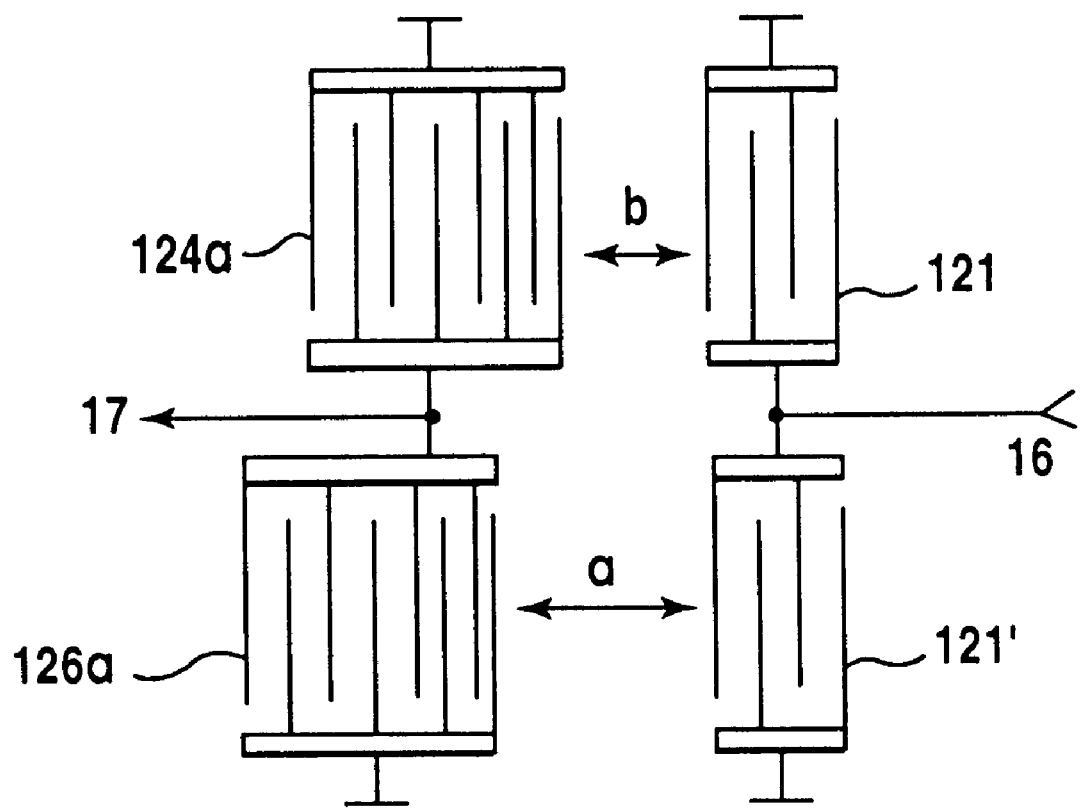
FIG. 13 is an elevational view of a temperature-compensated sensor according to a second further development.

Through the use of converters 124*a* and 126*a*, a sensor according to FIG. 13 is obtained, which is temperature-independent (and independent of other variables influencing the wave rate) and in which, as in the case of FIG. 12, the high-frequency or the low-frequency ends of the chirped (down-chirp or up-chirp) converters 124*a*/126*a* respective face the input/output converters 121, 121', that in this case are connected in parallel as an example, but may also be connected in series. The converters 124*a*/126*a* may be used as output/input converters. In FIG. 13 as well, a difference between a distance indicated by reference symbol a and a different distance indicated by reference symbol b is again indicated.

In the case of a configuration according to FIGS. 12 and 13 it may be advantageous, for example, to use a matched up-chirp interrogation signal, such as for the down-chirp structures that are represented. Consequently, the compressed response pulses which are already described above are obtained.

However, according to a second variant of the interrogation method, a sensor with mirror-symmetrically disposed chirp structures according to FIG. 12 may also be read out by the transmitter. A powerful short pulse is transmitted by the transmitter, for instance at the mid-frequency of the chirp range, or a chirp signal which is not matched to the structure and has spectra which cover the frequency range of the sensor as constantly as possible. A chirp pulse is then sent back by the sensor with a time delay. The shape of the envelope of this received chirp pulse permits the evaluation of the measured variable. If the same propagation rate of the acoustic wave prevails in the reference structure and in the prepared sensor structure, all of the symmetrically reflected acoustic waves of the same frequency are combined in a constructively interfering manner in the chirp pulse and the latter has an amplitude response which is constant over time. If, however, the propagation rates in the sensor structure and in the reference structure are different from each other, constructive and destructive interferences interchange upon passing through of the instantaneous frequency of the chirp pulse and its envelope has a modulation dependent on the difference in the rate of the wave in the reference structure and the wave in the sensor structure, i.e. a modulation corresponding to the measured variable. For example, a very small measured variable will only have a sloping amplitude response. On the other hand, as a consequence a great difference in the rates has a plurality of modulation periods distributed over the length of the chirp pulse, which are namely similar to standing waves on a line.

In a configuration according to FIG. 12, which is dimensioned in a matched manner and matched to the antenna, there is incidentally no need for acoustic energy to be dissipated in a sump of damping material, since the acoustic waves are completely reflected back without loss, in a manner corresponding to their frequency-specific propagation times, by the structures 124 and 126 into the converter 121. This is incidentally an advantage of the in-line configuration with a centrally disposed converter 121 according to FIG. 12, that is in comparison with a parallel two-track configuration of a reference structure and a sensor structure.

Figure 14:
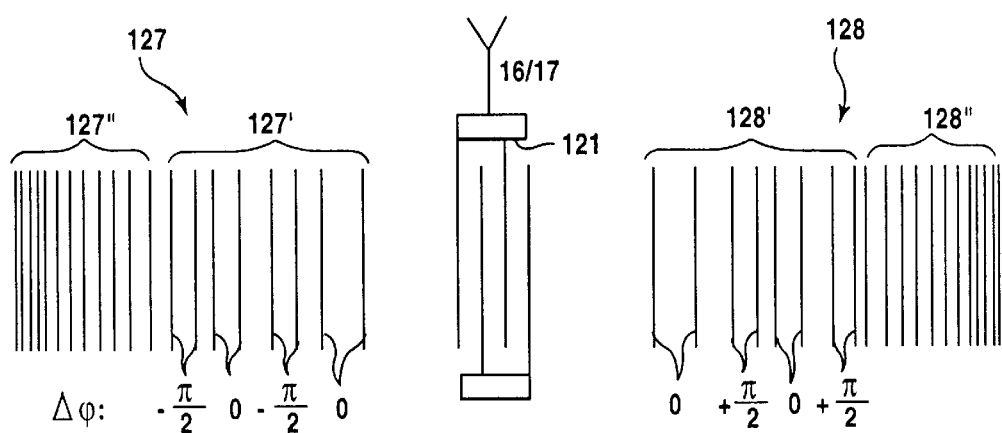
FIGS. 14 and 15 are elevational views of embodiments with coded structures.

A further possibility for the use/construction of the sensor according to FIG. 12 is shown by FIG. 14, in which the chirped structures, i.e. the wireless pulse response of the sensor structure, additionally includes a recognition code for the respective sensor. This is the monolithic combination of a chirped identity tag, based on interference, with a sensor according to FIG. 12 (or else according to FIG. 13), as already described above in another context. Reflector structures 127 and 128 are made up of component parts 127' and 128' generating the code in the pulse response (reflecting, for example, from a lower band limit $f_u$ of the chirp up to an intermediate frequency $f_z$) and of a reference component part 127" and a sensor component part 128". The sensor component part 128" is, for example, covered with a gas-sensitive layer as a gas detector. The other component parts 127", 128" reflect from the frequency $f_z$ up to the upper band limit of the chirp. Upon interrogation with a pulse having a great frequency bandwidth, a code bit of an amplitude 1 is generated in the pulse response with an instantaneous frequency $f_1$ if the reflector structures 127 and 128 are disposed mirror-symmetrically for this frequency, to be precise by constructive interference. A code bit of an amplitude 0 is produced by destructive interference at the frequency $f_0$ if the two acoustic waves reflected at the structures 127' and 128' are incident in the converter 121 with a phase difference of around $f_2$. That is to say that, for $f_2$, the structures 127' and 128' are disposed oppositely offset relative to each other inward or outward by one quarter of an acoustic wavelength in each case with respect to a configuration which is mirror-symmetrical in relation to the converter.

Figure 15:
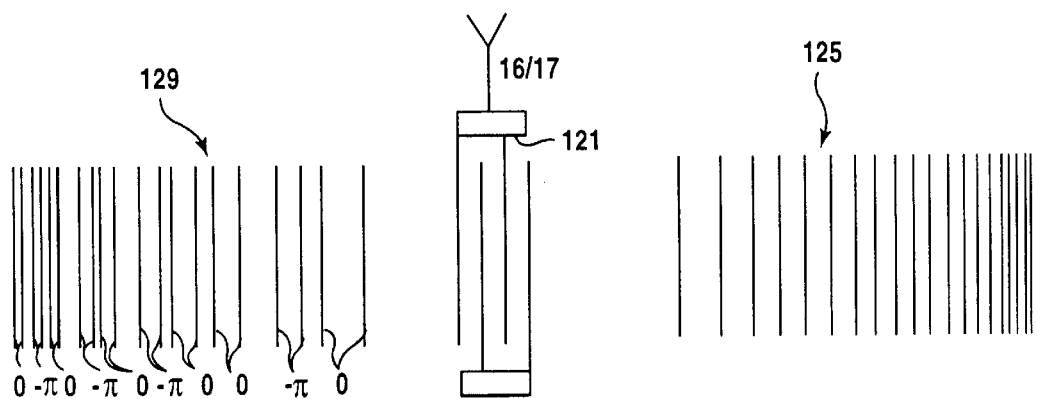

The same effect is accomplished incidentally if, at the frequency $f_2$, one of the two reflector structure component parts 127' and 128' has no phase modulation and the other has a phase coding with the increment corresponding to half an acoustic wavelength in the sensor (FIG. 15).

In the case of the embodiment of FIG. 14 as well, the advantage of temperature compensation and the reflection of the entire pulse energy, in principle without loss, comes to bear.

If a demodulation is used in the interrogation device in the instantaneous phase of the pulse response of the sensor, a sensor according to FIG. 15 can be used, in which an entire reference chirp structure 129 includes a phase-coded identification with the increment of half a wavelength, while the sensor component part is configured like the structure 125 in FIG. 12. In order to obtain the reference phase, a phase detector (Costas loop) accompanying the chirp and integrating the code phase, is used. As distinct from this reference phase, the coding can be recognized as a rapid phase change taking place in the code clock. In a way similar to that in the case of the pulse interrogation of the sensor according to FIG. 12, the sensor variable effects a two-stage modulation of the amplitude of the pulse response. The two stages correspond to the reference phase respectively offset by 0 and by half a wavelength. Consequently, this measured variable of the sensor can be obtained by scanning the chirp pulse either during the code clocks 1 or during the code clocks 0.

Yet another further development of the invention can be configured with a surface wave configuration having down-chirp structures corresponding to FIGS. 12 and 13.

However, only down-chirp structures can be used for the teaching of technical action underlying this further development, namely structures which have a sensitivity corresponding to the line B with a passage through zero, as is evident from FIG. 10a.

In the case of the configuration according to FIG. 12 or 13 there may be specified a structure for the chirped structures 124 and 126 in such a way that the chirp rate B/T for each of the two structures is exactly the value of the passage through zero of the line B of FIG. 10a. In other words this means that the multiplicand of the second term of the equation (3) in the parentheses of equation 3 is made equal to 0, i.e.

$$B/T = t_{down}/f_0 \quad (5)$$

Since, in the case of the down-chirp structure, the two expressions in parentheses have opposite operational signs, this expression in parentheses can actually be made equal to 0 for a predeterminable chirp rate B/T. Consequently, the dependence on the measured variable, which is indicated there as the temperature $\Theta$, cancels out of the equation 3.

In comparison with the above general teaching relating to FIGS. 12 and 13, which is based on a compensation of two contrary temperature dependencies, this further development of the invention has a surface wave configuration which, in principle, is temperature-independent due to appropriate setting of the chirp rate. This configuration is likewise not only temperature-independent, but also invariant with respect to other external influences changing the propagation time. In order to ensure that these surface wave configurations can also be used as a (temperature-independent) sensor, an additional measure is to be provided in order to nevertheless achieve a measured value sensitivity. For example, as was already described with respect to FIGS. 12 and 13, for measuring gases, one of the two structures 124, 126 may be provided with a coating which makes this structure sensitive to a respective gas in such a way that the action of such a gas influences the surface wave propagation time in this one structure. With such a configuration (apart from the gas), detection and measurement of the concentration of the gas can also be carried out (of course as seen within limits) temperature-independently as well as independently of other external effects influencing the surface wave rate.

The interrogation may take place with a matched up-chirp transmitting signal, so that a compressed pulse can be obtained as the response signal. If interrogation is carried out with a pulse, or a non-matched chirp signal such as a down-chirp signal, a longer signal is obtained and, for example, the envelope thereof is evaluated (as above).

What is claimed is:

1. In a system including an interrogation device having a transmitting part supplying interrogation signals, a receiving part and an evaluation part,
    a passive-apparatus to be interrogated by radio and used as a measuring sensor, comprising:
        a first passive surface wave structure defining a sensor element supplying sensor output signals upon receiving interrogation signals from the transmitting part of the interrogation device;
        a second passive surface wave structure defining a reference element supplying reference output signals upon receiving the interrogation signals from the transmitting part of the interrogation device;
        the interrogation device interrogating a measured value being formed from a comparison of the output sensor signals of said sensor element and the reference output signals of said reference element resulting from the interrogation signals; and
        said sensor element and said reference element having different sensitivities to a variable to be measured.

2. The apparatus according to claim 1, wherein:
    said first surface wave structure is at least one surface wave sensor element for a sensor function; and
    said second surface wave structure is a surface wave reference element for a reference function.

3. The apparatus according to claim 1, wherein:
    said surface wave elements are spatially combined; and including:
        antennas for radio transmission between the evaluation device and the sensor.

4. The apparatus according to claim 1, including a carrier, and respective substrates disposed on said carrier for said sensor element and said reference element.

5. The apparatus according to claim 4, wherein said respective substrates for said sensor element and for said reference element are formed of different piezoelectric materials.

6. The apparatus according to claim 1, including a carrier on which said at least one sensor element and said reference element are disposed, and a passively operating signal-preprocessing device disposed on said carrier.

7. The apparatus according to claim 1, wherein said reference element is disposed in the interrogation device remote from said sensor element.

8. The apparatus according to claim 1, including a further surface wave element for sensor identification.

9. The apparatus according to claim 8, wherein said surface wave structure acting as said sensor element has an identification function integrated therein.

10. The apparatus according to claim 8, wherein said surface wave structure acting as said sensor element has an identification structure additionally inserted therein.

11. The apparatus according to claim 8, wherein a measured-value signal and an identification signal with different frequencies are supplied.

12. The apparatus according to claim 8, wherein said sensor element and said reference element have a fixed mutual assignment, and said reference element has an identification function integrated or inserted therein.

13. The apparatus according to claim 1, including at least one other sensor element, said sensor elements being in radio communication with the interrogation device, and said sensor elements having different output signal frequencies.

14. The apparatus according to claim 1, including at least one other sensor element, said sensor elements being in radio communication with the interrogation device, and said sensor elements having different basic propagation times for differentation.

15. The apparatus according to claim 1, wherein signal evaluation is performed by phase discrimination.

16. The apparatus according to claim 1, wherein signal evaluation is performed by signal mixing.

17. The apparatus according to claim 1, wherein signal evaluation is performed by propagation time comparison.

18. The apparatus according to claim 1, wherein signal evaluation is performed by frequency comparison.

19. The apparatus according to claim 1, wherein band spreading is performed in the interrogation device.

20. The apparatus according to claim 1, including matched filters with pulse compression in the interrogation device.

21. The apparatus according to claim 1, wherein said sensor and reference surface wave structures are surface wave resonators.

22. The apparatus according to claim 1, wherein said sensor and reference surface wave structures are surface wave converters.

23. The apparatus according to claim 1, wherein said sensor and reference surface wave structures are surface wave delay lines.

24. The apparatus according to claim 1, wherein said sensor and reference surface wave structures are dispersive/PSK surface wave delay lines.

25. The apparatus according to claim 1, wherein said surface wave structures include low-loss filter surface wave configurations.

26. The apparatus according to claim 1, wherein said surface wave structures include chirped surface wave structures for a sensor function and a reference function.

27. The apparatus according to claim 26, including at least one converter, said surface wave structures including non-mirror-symmetrical surface wave structures with respect to said at least one converter.

28. The apparatus according to claim 26, including at least one converter, said surface wave structures including mirror-symmetrical surface wave structures with respect to said at least one converter.

29. The apparatus according to claim 26, wherein said chirp structures have the same chirp rate.

30. The apparatus according to claim 26, including at least one converter, said surface wave structures being disposed at different distances from said converter.

31. The apparatus according to claim 1, wherein said surface wave sensor element is prepared for a predetermined measured variable.

32. The apparatus according to claim 28, wherein one of said mirror-symmetrical surface wave structures is additionally prepared as a sensor element for sensitivity with respect to the predetermined measured or detection variable.

33. The apparatus according to claim 31, wherein said surface wave sensor structure has a gas-sensitive coating.

34. The apparatus according to claim 26, wherein said chirped surface wave structures have an additional identification coding, at least with respect to component parts.

35. The apparatus according to claim 34, wherein said coded surface wave structure has finger shifting.

36. The apparatus according to claim 1, including a converter, said converter and said surface wave structures being constructed as an in-line configuration.

37. The apparatus according to claim 1, including converters, said converters and said surface wave structures being distributed over parallel tracks .

38. The apparatus according to claim 26, wherein said surface wave elements are constructed for an interrogation with chirp interrogation signals.

39. The apparatus according to claim 26, wherein a chirp rate is matched to a chirp rate of said surface wave structures.

40. The apparatus according to claim 26, wherein an interrogation pulse is short.

41. The apparatus according to claim 26, wherein the interrogation signal is a non-matched chirped interrogation signal.

42. The apparatus according to claim 40, wherein a signal response has envelope detection.

43. The apparatus according to claim 41, wherein a signal response has envelope detection.

\* \* \* \* \*